US008508885B2

(12) United States Patent
Matsumoto et al.

(10) Patent No.: US 8,508,885 B2
(45) Date of Patent: Aug. 13, 2013

(54) MAGNETIC HEAD COMPRISING POLE INCLUDING NONMAGNETIC LAYER AND DISK DRIVE WITH THE SAME

(75) Inventors: Takuya Matsumoto, Ome (JP); Tomoko Taguchi, Kunitachi (JP); Masayuki Takagishi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

(21) Appl. No.: 13/218,196

(22) Filed: Aug. 25, 2011

(65) Prior Publication Data

US 2012/0134046 A1 May 31, 2012

(30) Foreign Application Priority Data

Nov. 30, 2010 (JP) ................................. 2010-266713

(51) Int. Cl.
*G11B 5/127* (2006.01)
*G11B 5/187* (2006.01)

(52) U.S. Cl.
USPC ................................. 360/125.3; 360/125.03

(58) Field of Classification Search
USPC ......... 360/59, 125.31, 125.74, 125.3, 125.12, 360/125.03, 128
See application file for complete search history.

(56) References Cited

U.S. PATENT DOCUMENTS

| 7,791,829 B2 * | 9/2010 | Takeo et al. ..................... 360/55 |
| 7,982,996 B2 * | 7/2011 | Smith et al. ..................... 360/59 |
| 8,120,875 B2 * | 2/2012 | Takagishi et al. ........ 360/125.31 |
| 2009/0225465 A1 * | 9/2009 | Iwasaki et al. .................. 360/75 |
| 2009/0310244 A1 | 12/2009 | Shimazawa et al. |
| 2010/0073806 A1 * | 3/2010 | Koui et al. ....................... 360/75 |
| 2010/0309577 A1 * | 12/2010 | Gao et al. ......................... 360/75 |
| 2011/0038080 A1 * | 2/2011 | Alex et al. ............... 360/123.02 |

FOREIGN PATENT DOCUMENTS

| JP | 2008-123600 | 5/2008 |
| JP | 2008-226424 | 9/2008 |
| JP | 2009-070541 | 4/2009 |
| JP | 2009-076127 | 4/2009 |
| JP | 2009-176399 | 8/2009 |
| JP | 2009-301695 | 12/2009 |
| JP | 2010-182361 | 8/2010 |

OTHER PUBLICATIONS

Japanese Application No. 2010-266713 Office Action (Sep. 18, 2012) (English translation attached).

* cited by examiner

*Primary Examiner* — Brian Miller
(74) *Attorney, Agent, or Firm* — Patterson & Sheridan, LLP

(57) ABSTRACT

According to one embodiment, a magnetic head includes a main pole configured to apply a recording magnetic field, a return pole opposed to a trailing side of the main pole across a write gap and configured to return magnetic flux from the main pole, a coil configured to excite magnetic flux in the main pole, a spin-torque oscillator located between respective facing surfaces of the return pole and an end portion of the main pole on the recording-medium side and configured to produce a high-frequency magnetic field, a current source configured to apply current to the spin-torque oscillator through the return and main poles, and a nonmagnetic layer provided in at least one of the poles and extending from a facing surface of the at least one of the poles, which faces the spin-torque oscillator, in a direction across the facing surface.

14 Claims, 13 Drawing Sheets

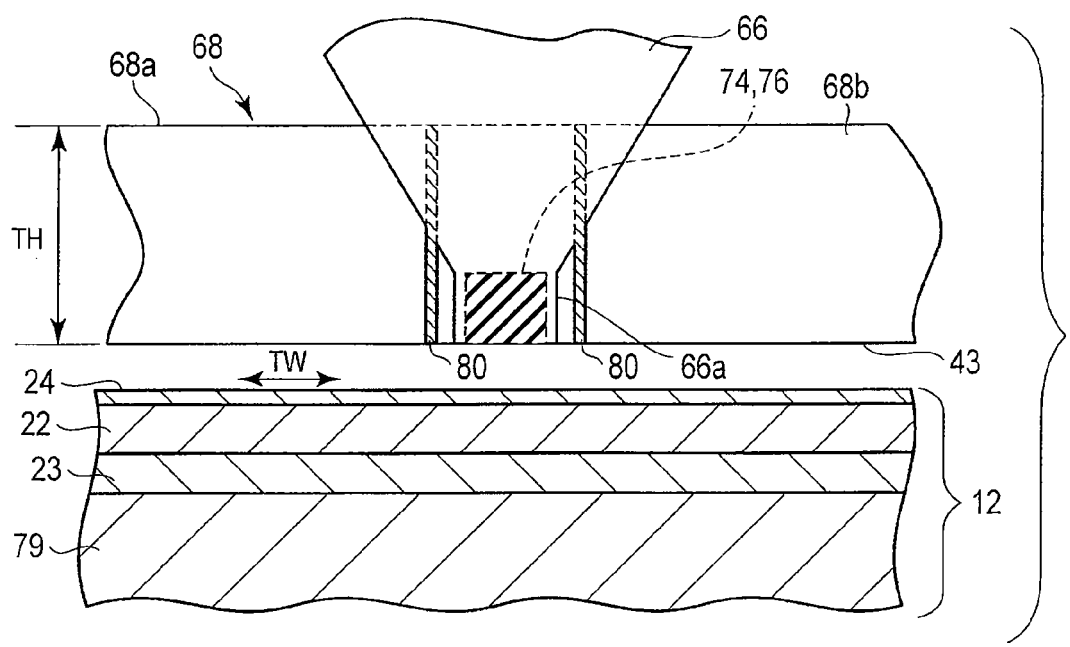
F I G. 6
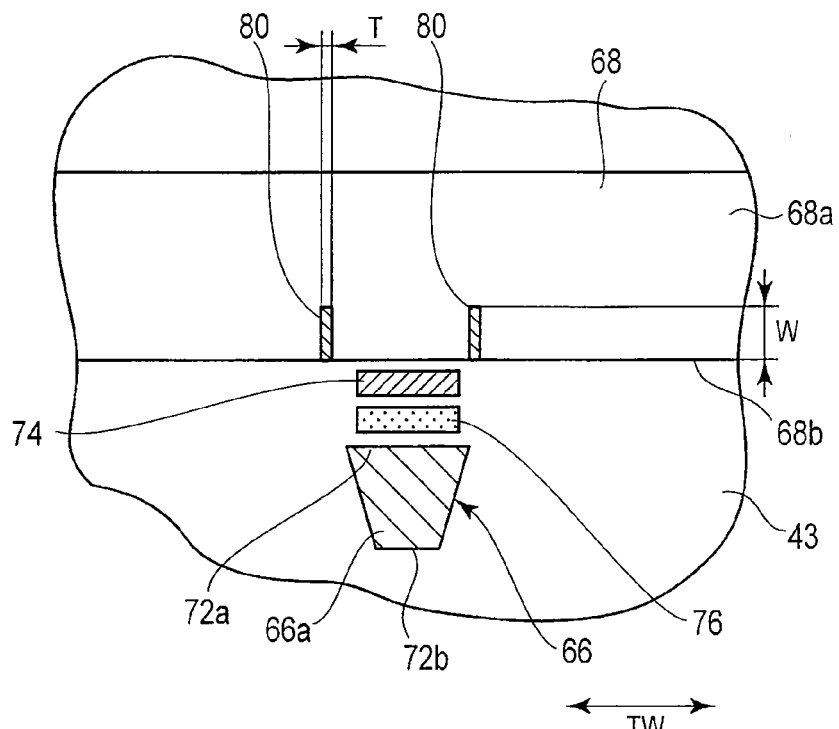
F I G. 7

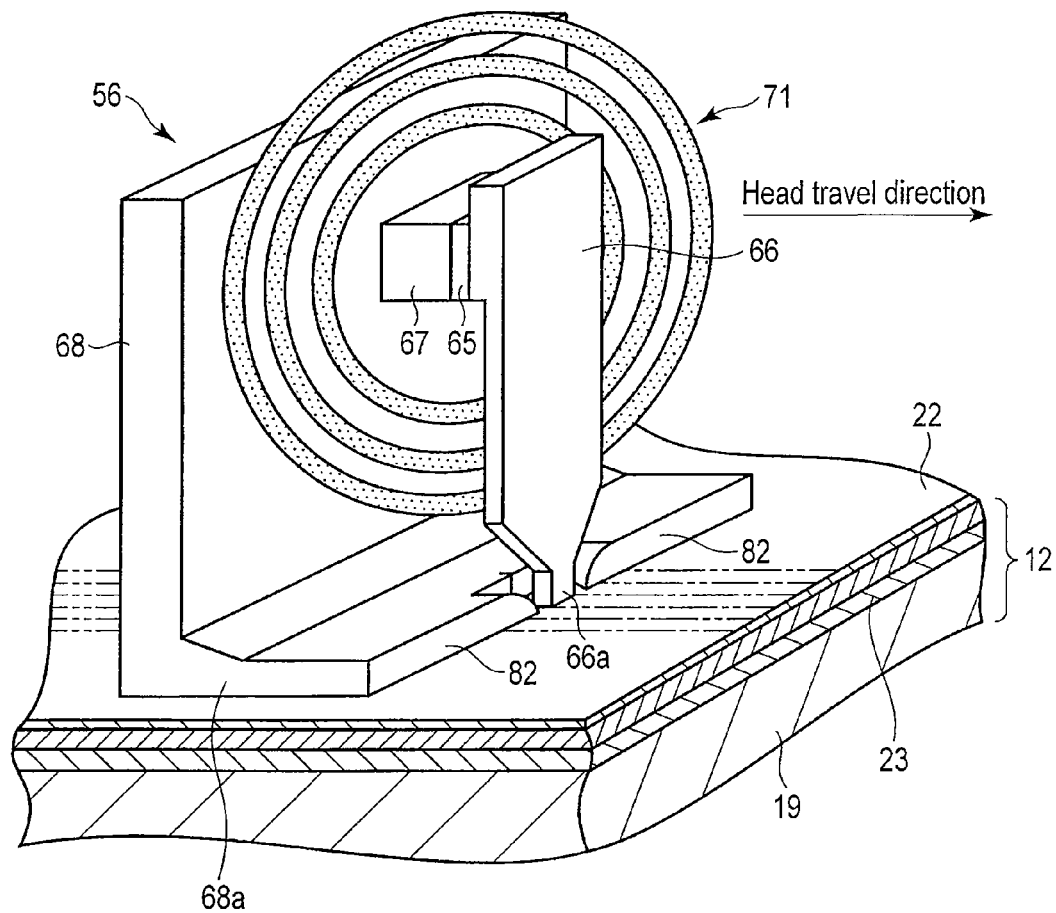
F I G. 12

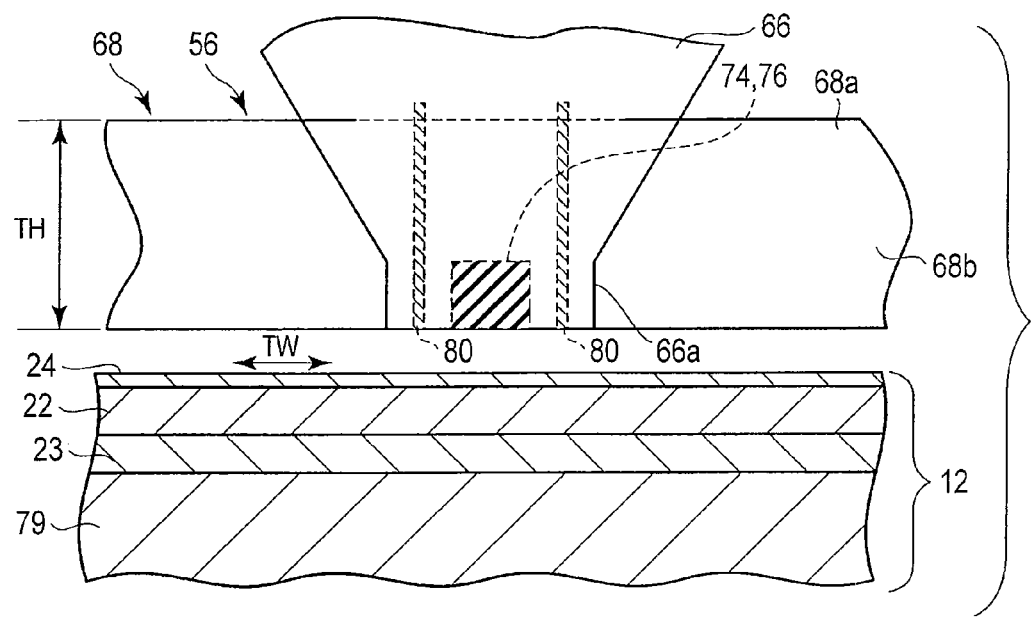
F I G. 17
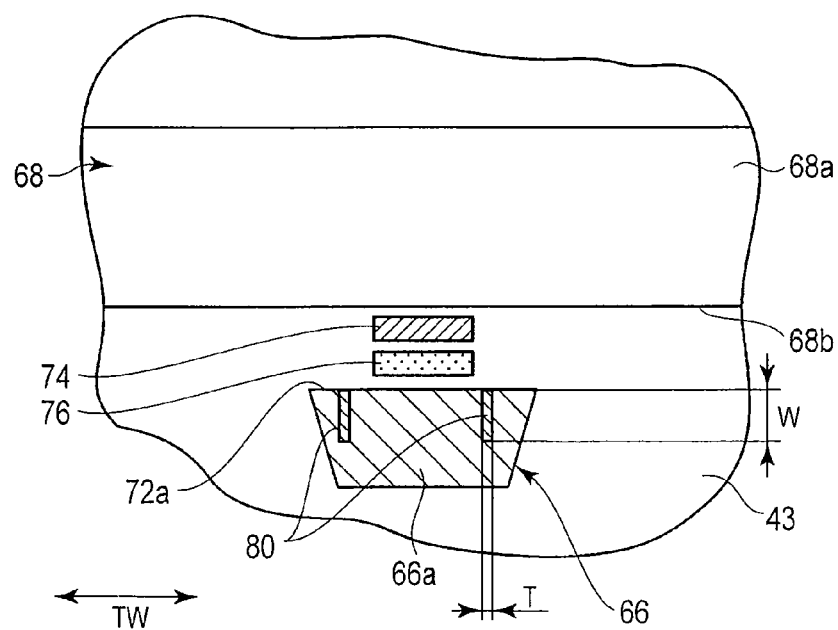
F I G. 18

MAGNETIC HEAD COMPRISING POLE INCLUDING NONMAGNETIC LAYER AND DISK DRIVE WITH THE SAME

CROSS-REFERENCE TO RELATED APPLICATIONS

This application is based upon and claims the benefit of priority from Japanese Patent Application No. 2010-266713, filed Nov. 30, 2010; the entire contents of which are incorporated herein by reference.

FIELD

Embodiments described herein relate generally to a magnetic head for perpendicular magnetic recording used in a disk drive and the disk drive provided with the same.

BACKGROUND

A disk drive, such as a magnetic disk drive, comprises a magnetic disk, spindle motor, magnetic head, and carriage assembly. The magnetic disk is disposed in a case. The spindle motor supports and rotates the disk. The magnetic head reads data from and writes data to the disk. The carriage assembly supports the head for movement relative to the disk. A head section of the magnetic head comprises a recording head for writing and a reproduction head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, return or write/shield pole, and coil. The return pole is located on the trailing side of the main pole with a write gap therebetween and configured to close a magnetic path that leads to a magnetic disk. The coil serves to pass magnetic flux through the main pole.

In order to improve the recording density, a high-frequency magnetic field assisted recording head is proposed, in which a spin-torque oscillator for use as a high-frequency oscillatory element is disposed between main and return poles and a high-frequency magnetic field from the spin-torque oscillator is applied to a magnetic recording layer. This magnetic head is constructed so that its gap magnetic field is enlarged by reducing the distance between the respective facing surfaces of the main and return poles.

In the case of the magnetic head described above, however, the spin-torque oscillator is located close to the main and return poles. Therefore, magnetization rotation in the spin-torque oscillator is transmitted to the main and return poles and further propagates as spin waves to the entire film surface of the poles. Thereupon, a magnetic field opposite to the gap magnetic field for effectively causing the spin-torque oscillator to oscillate is produced. Thus, the gap magnetic field is reduced by the produced magnetic field, so that satisfactory oscillation is prevented. Consequently, the high-frequency magnetic field for achieving magnetization reversal of the recording layer of a perpendicular recording medium is not sufficiently strong, so that the recorded signal quality is poor.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is an exemplary front view of the disk-side end portion of the recording head taken from the main-pole side;

FIG. 7 is an exemplary plan view of the recording head portion taken from the ABS side of a slider;

FIG. 12 is an exemplary perspective view schematically showing a recording head of a magnetic head of an HDD according to a third embodiment;

FIG. 17 is an exemplary enlarged front view showing a disk-side portion of a recording head of an HDD according to a fifth embodiment;

FIG. 18 is an exemplary plan view of the recording head taken from the ABS side;

DETAILED DESCRIPTION

Various embodiments will be described hereinafter with reference to the accompanying drawings.

In general, according to one embodiment, a magnetic head for perpendicular magnetic recording, comprises a main pole configured to apply a recording magnetic field perpendicular to a recording layer of a recording medium; a return pole opposed to a trailing side of the main pole across a write gap and configured to return magnetic flux from the main pole to form a magnetic circuit in conjunction with the main pole; a coil configured to excite magnetic flux in the magnetic circuit;

a spin-torque oscillator located between respective facing surfaces of the return pole and an end portion of the main pole on the recording-medium side and configured to produce a high-frequency magnetic field; a current source configured to apply current to the spin-torque oscillator through the return and main poles; and a nonmagnetic layer provided in at least one of the poles and extending from a facing surface of the at least one of the poles, which faces the spin-torque oscillator, in a direction across the facing surface.

The following is a description of various embodiments.

Figure 1:
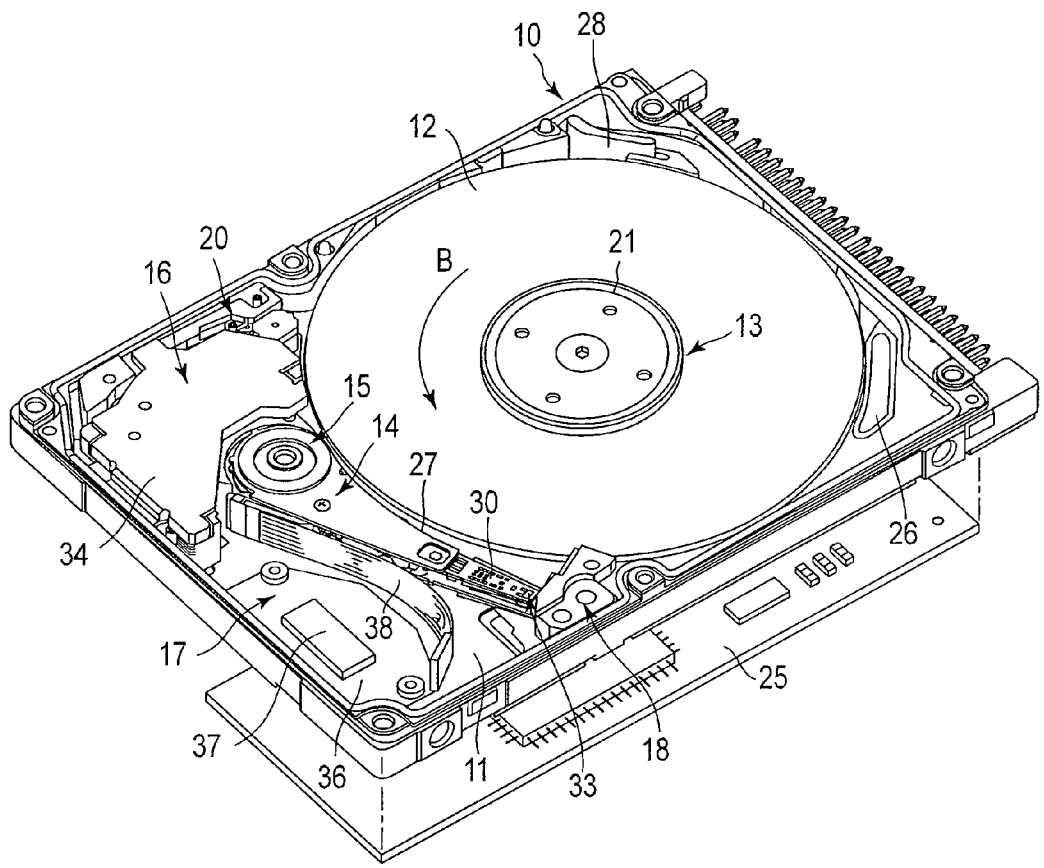
FIG. 1 is an exemplary perspective view showing a magnetic disk drive (HDD) according to a first embodiment.
Figure 2:
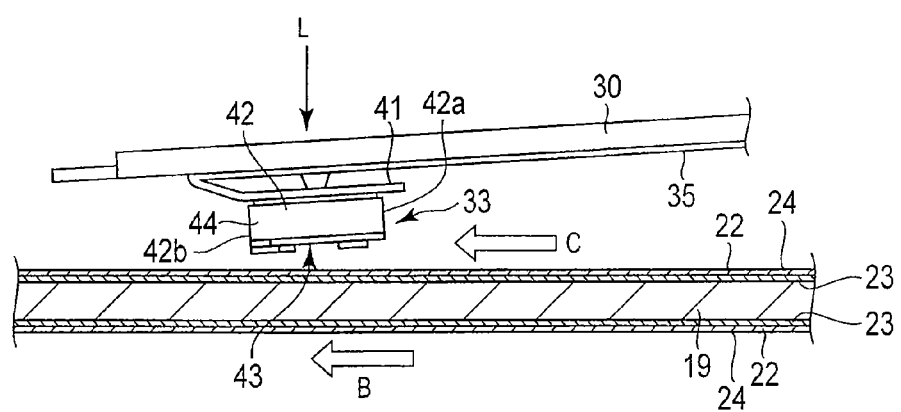
FIG. 2 is an exemplary side view showing a magnetic head and suspension of the HDD.

FIG. 1 shows the internal structure of a hard disk drive (HDD) according to a first embodiment, as a disk drive, with its top cover removed, and FIG. 2 shows a flying magnetic head. As shown in FIG. 1, the HDD comprises a housing 10. The housing 10 comprises a base 11 in the form of an open-topped rectangular box and a top cover (not shown) in the form of a rectangular plate. The top cover is attached to the base by screws so as to close the top opening of the base. Thus, the housing 10 is kept airtight inside and can communicate with the outside through a breather filter 26 only.

The base 11 carries thereon a magnetic disk 12, for use as a recording medium, and a mechanical unit. The mechanical unit comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record data in and reproduce data from the disk 12. The head actuator 14 supports the heads 33 for movement relative to the surfaces of the disk 12. The VCM 16 pivots and positions the head actuator. The base 11 further carries a ramp loading mechanism 18, inertial latch 20, and board unit 17. The ramp loading mechanism 18 holds the magnetic heads 33 in positions off the magnetic disk 12 when the heads are moved to the outermost periphery of the disk. The inertial latch 20 holds the head actuator 14 in a retracted position if the HDD is jolted, for example. Electronic components, such as a preamplifier, head IC, etc., are mounted on the board unit 17.

A control circuit board 25 is attached to the outer surface of the base 11 by screws so as to face a bottom wall of the base. The circuit board 25 controls the operations of the spindle motor 13, VCM 16, and magnetic heads 33 through the board unit 17.

As shown in FIGS. 1 and 2, the magnetic disk 12 is constructed as a perpendicular magnetic recording medium. The magnetic disk 12 comprises a substrate 19 formed of a non-magnetic disk with a diameter of, for example, about 2.5 inches. A soft magnetic layer 23 called a soft magnetic underlayer is formed on each surface of the substrate 19. The soft magnetic layer 23 is overlain by a perpendicular magnetic recording layer 22, which has a magnetic anisotropy perpendicular to the disk surface. Further, a protective film 24 is formed on the recording layer 22.

As shown in FIG. 1, the magnetic disk 12 is coaxially mounted on the hub of the spindle motor 13 and clamped and secured to the hub by a clamp spring 21, which is attached to the upper end of the hub by screws. The disk 12 is rotated at a predetermined speed in the direction of arrow B by the spindle motor 13 for use as a drive motor.

The head actuator 14 comprises a bearing unit 15 secured to the bottom wall of the base 11 and a plurality of arms 27 extending from the bearing unit. The arms 27 are located parallel to the surfaces of the magnetic disk 12 so as to be spaced apart from one another and extend in the same direction from the bearing unit 15. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. The magnetic heads 33 are supported individually on the respective extended ends of the suspensions 30. Each arm 27 and its corresponding suspension 30 constitute a head suspension, and the head suspension and each magnetic head 33 constitute a head suspension assembly.

As shown in FIG. 2, each magnetic head 33 comprises a substantially cuboid slider 42 and read/write head section 44 on an outflow end (trailing end) of the slider. Each head 33 is secured to a gimbal spring 41 on the distal end portion of each corresponding suspension 30. A head load L directed to the surface of the magnetic disk 12 is applied to each head 33 by the elasticity of the suspension 30. The two arms 27 are arranged parallel to and spaced apart from each other, and the suspensions 30 and heads 33 mounted on these arms face one another with the magnetic disk 12 between them.

Each magnetic head 33 is electrically connected to a main FPC 38 (described later) through a relay flexible printed circuit board (FPC) 35 secured to the suspension 30 and arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 11. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing unit 15 in the direction opposite to the arms 27 and a voice coil supported on the support frame. When the head actuator 14 is assembled to the base 11, the voice coil is located between a pair of yokes 34 that are secured to the base 11. Thus, the voice coil, along with the yokes and a magnet secured to one of the yokes, constitutes the VCM 16.

If the voice coil of the VCM 16 is energized with the magnetic disk 12 rotating, the head actuator 14 pivots, whereupon each magnetic head 33 is moved to and positioned on a desired track of the disk 12. As this is done, the head 33 is moved radially relative to the disk 12 between the inner and outer peripheral edges of the disk.

Figure 3:
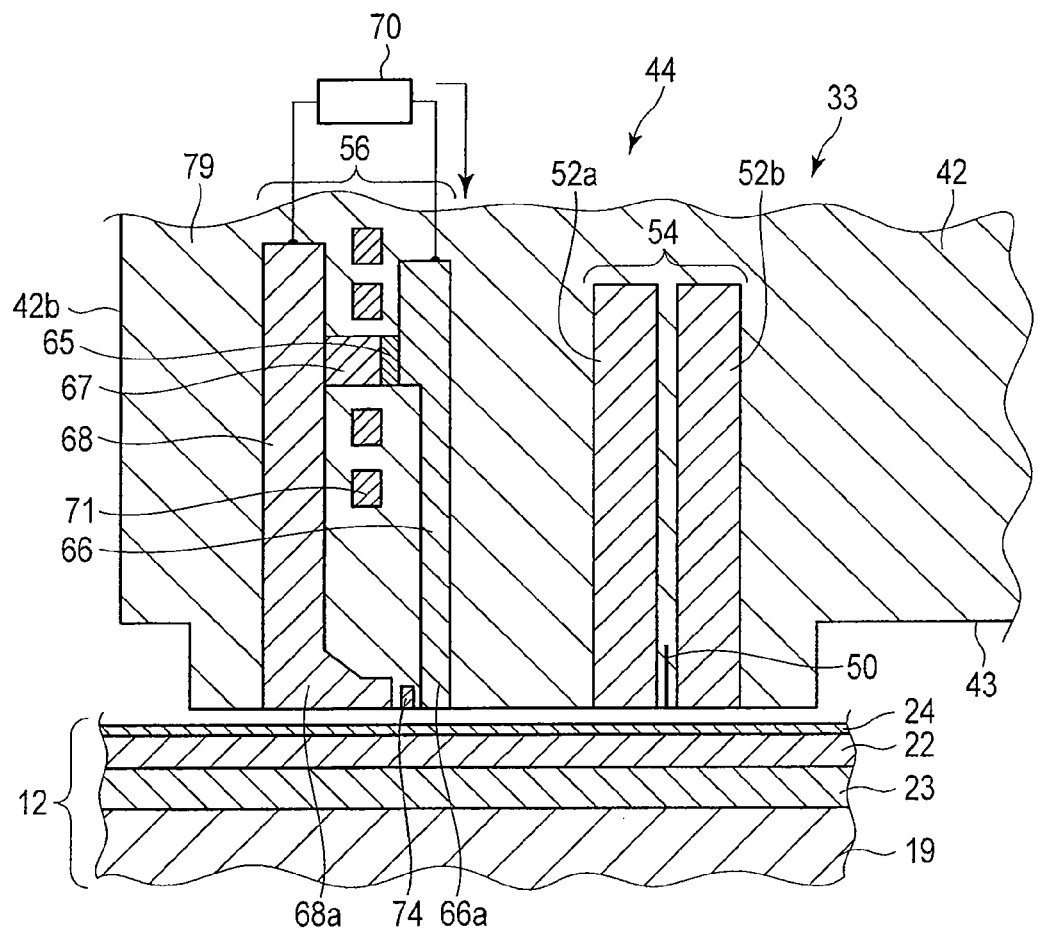
FIG. 3 is an exemplary enlarged sectional view showing a head section of the magnetic head.

The following is a detailed description of a configuration of each magnetic head 33. FIG. 3 is an enlarged sectional view showing the head section 44 of the head 33.

As shown in FIGS. 2 and 3, the magnetic head 33 is formed as a flying head, and comprises the substantially cuboid slider 42 and the head section 44 formed on the outflow or trailing end of the slider. The slider 42 is formed of, for example, a sintered body (AlTic) containing alumina and titanium carbide, and the head section 44 is a thin film.

The slider 42 has a rectangular disk-facing surface or air-bearing surface (ABS) 43 configured to face a surface of the magnetic disk 12. The slider 42 is kept flying a predetermined distance above the disk surface by airflow C that is produced between the disk surface and the ABS 43 as the disk 12 rotates. The direction of airflow C is coincident with the direction of rotation B of the disk 12. The slider 42 is disposed on the surface of the disk 12 in such a manner that the longitudinal direction of the ABS 43 is substantially coincident with the direction of airflow C.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIG. 3, the head section 44 is formed as a dual-element magnetic head, comprising a reproduction head 54 and recording head 56 formed on the trailing end 42b of the slider 42 by thin-film processing.

The reproduction head 54 comprises a magnetic film 50 having a magnetoresistive effect and shield films 52a and 52b disposed on the trailing and leading sides, respectively, of the magnetic film so as to sandwich the magnetic film between them. The respective lower ends of the magnetic film 50 and shield films 52a and 52b are exposed in the ABS 43 of the slider 42.

The recording head 56 is located nearer to the trailing end 42b of the slider 42 than the reproduction head 54. The recording head 56 is constructed as a single-pole head comprising a return pole on the trailing end side.

Figure 4:
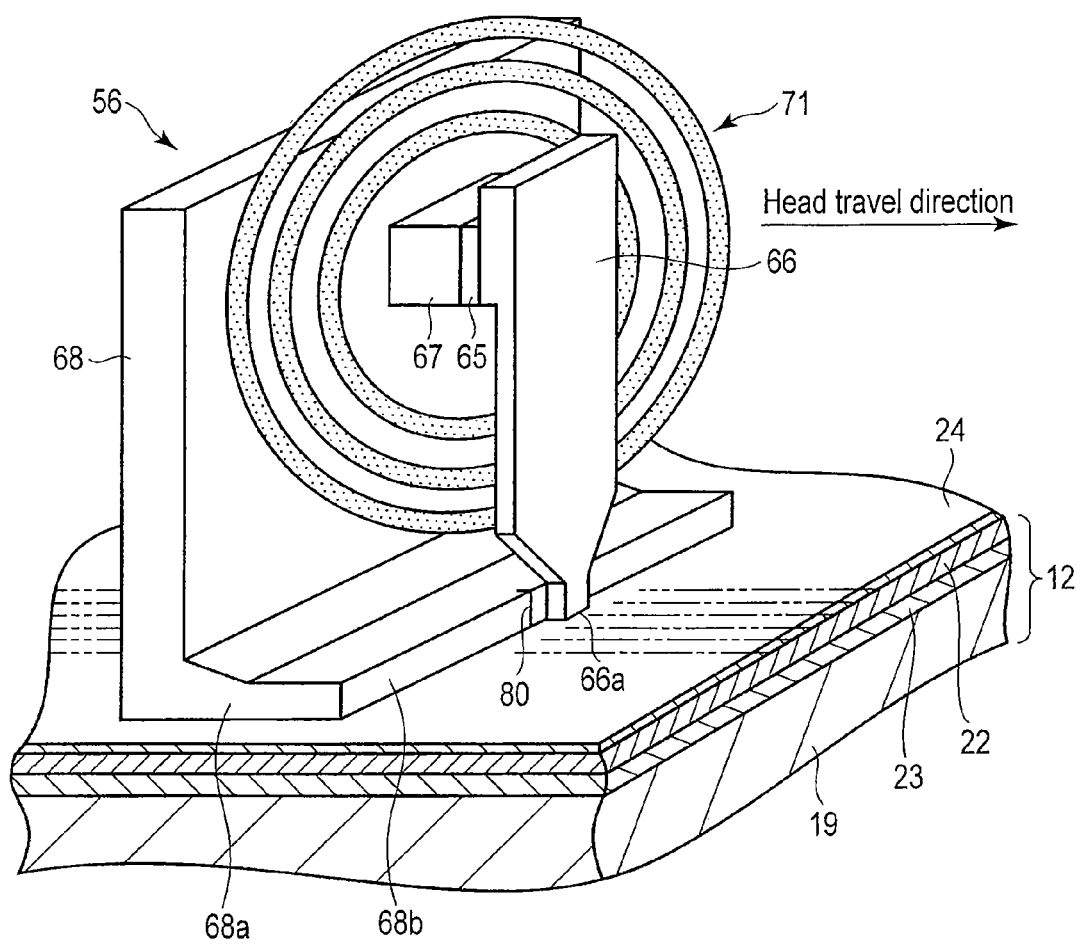
FIG. 4 is an exemplary perspective view schematically showing a recording head of the magnetic head.
Figure 5:
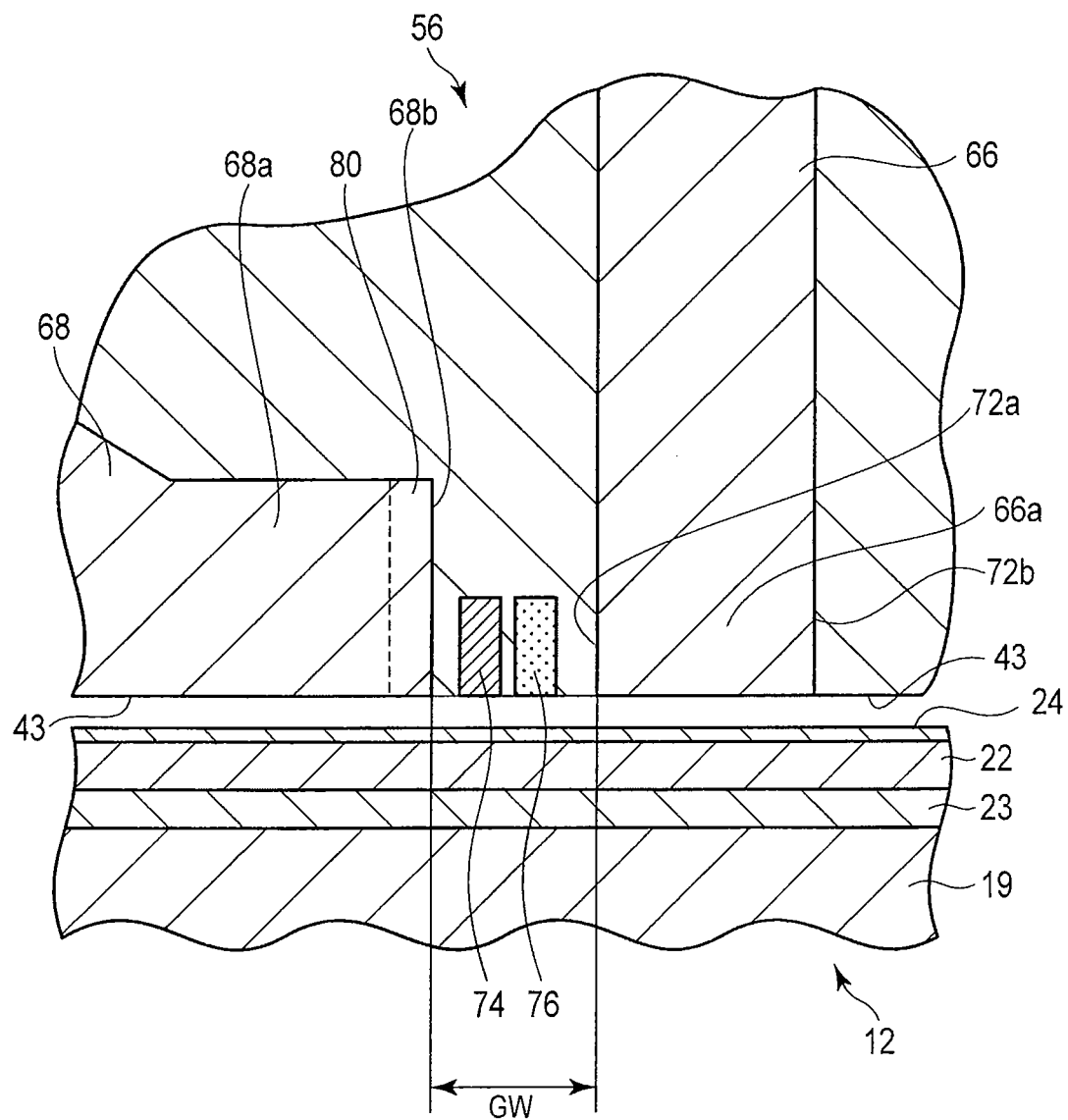
FIG. 5 is an exemplary enlarged sectional view showing a disk-side end portion of the recording head.

FIG. 4 is a perspective view schematically showing the recording head 56 and magnetic disk 12, FIG. 5 is an enlarged side view showing a disk-side end portion of the recording head, and FIG. 6 is a front view of the disk-side end portion of the recording head taken from the main-pole side. FIG. 7 is a plan view of the recording head portion taken from the ABS side of the slider 42.

As shown in FIGS. 3 and 4, the recording head 56 comprises a main pole 66, return pole (write/shield pole) 68, junction 67, and recording coil 71. The main pole 66 is formed from a high-permeability material and produces a recording magnetic field perpendicular to the surfaces of the magnetic disk 12. The return pole 68 is located on the trailing side of the main pole 66 and serves to efficiently close a magnetic path through the soft magnetic layer 23 just below the main pole. The junction 67 connects respective upper parts of the main and return poles 66 and 68. The recording coil 71 is located so as to wind around a magnetic path including the main and return poles 66 and 68 to pass magnetic flux to the main pole 66 while a signal is being recorded on the magnetic disk 12. An insulating layer 65 for electrically insulating the main and return poles 66 and 68 is formed on the junction 67.

A current source 70 is connected to the main and return poles 66 and 68, and a current circuit is constructed so that current from the current source can be passed through the poles 66 and 68 in series.

As shown in FIGS. 3 to 7, the main pole 66 extends substantially at right angles to the surfaces of the magnetic disk 12. A distal end portion 66a of the main pole 66 on the disk side is tapered toward the disk surface. As shown in FIG. 7, the distal end portion 66a of the main pole 66 has, for example, a trapezoidal cross-section, and comprises a trailing end surface 72a, leading end surface 72b, and opposite side surfaces. The trailing end surface 72a of a predetermined width is located on the trailing end side. The leading end surface 72b, which is narrower than the trailing end surface, is opposed to the trailing end surface. The distal end surface of the main pole 66 is exposed in the ABS 43 of the slider 42. In the present embodiment, the width of the trailing end surface 72a is substantially equal to the track width of the magnetic disk 12.

As shown in FIGS. 3 to 7, the return pole 68 is substantially L-shaped and its distal end portion 68a has an elongated rectangular shape. The distal end surface of the return pole 68 is exposed in the ABS 43 of the slider 42. A leading end surface 68b of the distal end portion 68a extends along the track width of the magnetic disk 12. The leading end surface 68b is opposed parallel to the trailing end surface 72a of the main pole 66 with write gap WG therebetween.

The recording head 56 comprises a high-frequency oscillator, e.g., a spin-torque oscillator 74, interposed between the return pole 68 and the distal end portion 66a of the main pole 66. The oscillator 74 is located between and parallel to the trailing end surface 72a of the distal end portion 66a of the main pole 66 and the leading end surface 68b of the return pole 68. The spin-torque oscillator 74 has its distal end exposed in the ABS 43 and is disposed flush with the distal end face of the main pole 66 with respect to the surface of the magnetic disk 12. Under the control of the control circuit board 25, the oscillator 74 oscillates as it is supplied with current from the current source 70 through the main and return poles 66 and 68, thereby applying a high-frequency magnetic field to the magnetic disk 12. Thus, the main and return poles 66 and 68 serve as electrodes for perpendicular energization of the oscillator 74.

The spin-torque oscillator 74 is formed by successively laminating, for example, an electrode film, intermediate layer with high spin permeability, oscillatory layer, bias layer, and electrode layer from the return-pole side to main-pole side. To facilitate oscillation of the oscillator 74, moreover, a spin injection layer 76 is disposed on the main-pole side of the oscillator 74. Preferably, the length of the trailing end surface 72a of the distal end portion 66a of the main pole 66 along the track width is greater than that of the oscillator 74.

As shown in FIGS. 4 to 7, a pair of nonmagnetic layers 80 for use as nonmagnetic portions are arranged on the leading end surface 68b of the return pole 68 that faces the spin-torque oscillator 74. For example, alumina ($Al_2O_3$), ruthenium, or copper may be used for the nonmagnetic layers 80. The nonmagnetic layers 80 are disposed in the return pole 68 so as to extend from its leading end surface 68b and separate from the oscillator 74. In other words, the nonmagnetic layers 80 extend at an angle from the leading end surface 68b into the return pole 68. In the present embodiment, each nonmagnetic layer 80 extends at right angles to the leading end surface 68b into the return pole. Further, each nonmagnetic layer 80 extends upward from the lower end surface of the return pole 68, that is, the ABS 43, to the upper surface of the distal end portion of the return pole.

Preferably, the pair of nonmagnetic layers 80 should be located outside the end positions of the trailing end surface of the main pole 66 along the track width. Further, the distance between the nonmagnetic layers 80 along the track width is slightly greater than the width of the spin-torque oscillator 74 along the track width. Thus, the nonmagnetic layers 80 are located outside the end positions of the oscillator 74 along the track width.

The thickness T of each nonmagnetic layer 80 in the direction of the track width TW is set to be about 1 nm. The lattice constant of typical FeNi (permalloy) used for the return pole 68 is 3.55 Å. Therefore, propagation of spin waves transmitted from the spin-torque oscillator 74 to the return pole 68 by ferromagnetic coupling of atoms can be fully suppressed with a thickness of 1 nm.

The width W of each nonmagnetic layer 80 along the depth, that is, perpendicular to the leading end surface 68b, is set to be 5 nm or more. The propagation of spin waves perpendicular to the trailing end surface of the return pole 68, compared with those propagated along the film surface of the return pole 68, is prevented by the flow of magnetic flux in the magnetic path including the main and return poles 66 and 68. Therefore, a propagation suppression effect can be obtained if each nonmagnetic layer 80 has width W of 5 to 10 nm.

Since spin waves propagate to the entire film surface of the return pole 68, the height of each nonmagnetic layer 80 above the ABS 43 should preferably be made equal to the length TH of the return pole 68 above the ABS 43.

If the VCM 16 is powered, according to the HDD constructed in this manner, the head actuator 14 pivots, whereupon each magnetic head 33 is moved to and positioned on a desired track of the magnetic disk 12. As the magnetic disk 12 rotates, the magnetic head 33 is caused to fly by airflow C that is produced between the disk surface and the ABS 43. When the HDD is operating, the ABS 43 of the slider 42 is opposed to the disk surface across a gap. When the magnetic head 33 flies, as shown in FIG. 2, it is inclined so that the recording head 56 of the head section 44 is located closest to the disk surface. In this state, data recorded in the magnetic disk 12 is read by the reproduction head 54, while data is written by the recording head 56.

In writing data, a direct current is supplied to the spin-torque oscillator 74 to produce a high-frequency magnetic field, which is applied to the perpendicular magnetic recording layer 22 of the magnetic disk 12. Further, the main pole 66 is energized by the recording coil 71 so that a perpendicular high-frequency magnetic field is applied from the main pole to the recording layer 22 of the disk 12 just below it, whereby data is recorded with a desired track width. By superposing the high-frequency magnetic field on the recording magnetic field, magnetic recording can be achieved with high retention and high magnetic anisotropic energy.

If current is passed between the main and return poles 66 and 68 at right angles to the film surface of the spin-torque oscillator 74 so that the recording coil 71 is energized, in the magnetic head 33 of the present embodiment, magnetization in the spin-torque oscillator 74 starts to rotate uniformly, urged by a gap magnetic field produced between the poles 66 and 68. At the same time, the magnetization rotation is transmitted to the poles 66 and 68, and two types of waves transmitted by ferromagnetic coupling of atoms and by a magnetic field propagate as associated spin waves to the return pole 68. Therefore, the gap magnetic field is reduced, and initial uniform oscillatory rotation in the spin-torque oscillator is degraded. According to the magnetic head 33, however, the spin wave propagation is stopped by the nonmagnetic layers 80. Therefore, absorption of the spin waves by the return pole 68 is suppressed, and the degradation of the gap magnetic field can be minimized. Thus, desired oscillation of the spin-torque oscillator 74 can be maintained. Consequently, a satisfactory magnetization reversal state can be realized for the recording layer 22 of the recording medium, so that high-quality signal recording can be achieved.

Figures 8A, 8B:
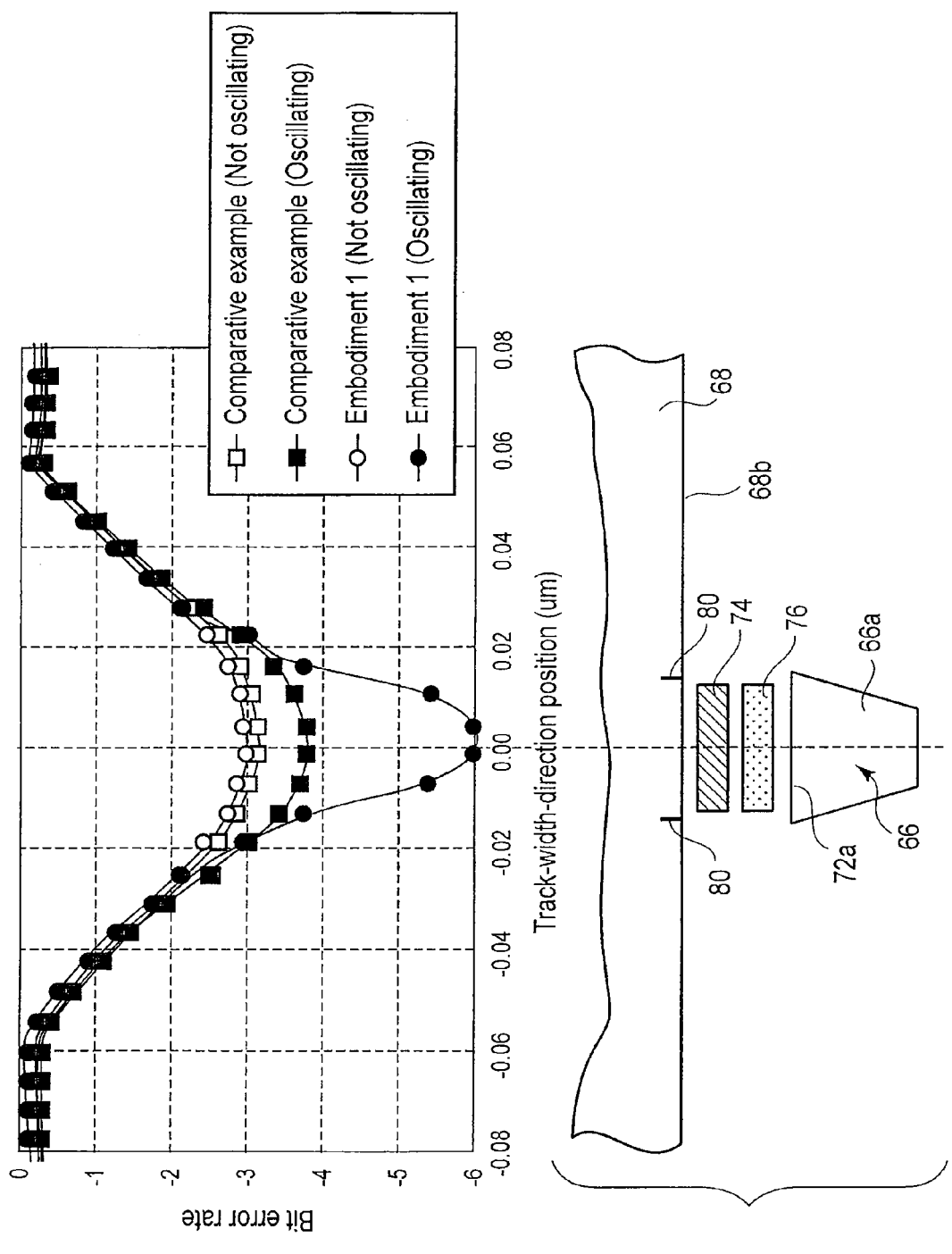
FIG. 8A is an exemplary diagram comparatively showing relationships between the track-width-direction position and bit error rate for a magnetic head according to a comparative example and the magnetic head according to the first embodiment.
FIG. 8B is an exemplary plan view of the recording head portion taken from the ABS side of the slider.

FIG. 8A comparatively shows profiles of bit error rates along the track width for the recording head of the magnetic head 33 of the present embodiment and a recording head of a comparative example (magnetic head without a nonmagnetic layer). FIG. 8B schematically shows a configuration of the recording head of the present embodiment taken from the ABS side.

As shown in FIGS. 8A and 8B, a position 0 along the track width is assumed to be a central position for the main pole 66 and spin-torque oscillator 74 of the recording head along the track width. A characteristic curve plotted by open squares (□) is a profile of the bit error rate along the track width for the magnetic head of the comparative example with the spin-torque oscillator 74 not oscillating, that is, without conduction between the main and return poles 66 and 68. A characteristic curve plotted by filled squares (■) is a profile of the bit error rate along the track width for the recording head of the comparative example with the spin-torque oscillator 74 oscillating, that is, with the main and return poles 66 and 68 in conduction. The comparison between these characteristic curves indicates that the degree of improvement of the bit error rate for the recording head of the comparative example is low despite the oscillation of the spin-torque oscillator. This is because the oscillation of the oscillator 74 is not satisfactory due to the spin waves that propagate to the film surface of the return pole 68.

In FIGS. 8A and 8B, a characteristic curve plotted by open circles (○) is a profile of the bit error rate along the track width for the recording head of the magnetic head 33 of the present embodiment with the spin-torque oscillator 74 not oscillating. A characteristic curve plotted by filled circles (●) is a profile of the bit error rate along the track width for the recording head of the present embodiment with the spin-torque oscillator 74 oscillating. The comparison between these characteristic curves indicates that the bit error rate obtained when the spin-torque oscillator 74 of the magnetic head of the present embodiment is caused to oscillate is considerably improved compared with the case of spin-torque oscillation in the recording head of the comparative example. Thus, it is evident that the spin waves can be prevented from propagating to the film surface of the return pole 68, so that the spin-torque oscillator 74 can be effectively caused to oscillate. Since the degree of improvement of the bit error rate along the track width is substantially equal to that for the spin-torque oscillator 74, the track density can be maintained or improved depending on the width of the spin-torque oscillator.

The following is a description of magnetic heads of HDDs according to alternative embodiments. In the description of these alternative embodiments to follow, like reference numbers are used to designate the same parts as those of the first embodiment, and a detailed description thereof is omitted. Thus, parts different from those of the first embodiment will be mainly described in detail hereinafter.

Second Embodiment

Figure 9:
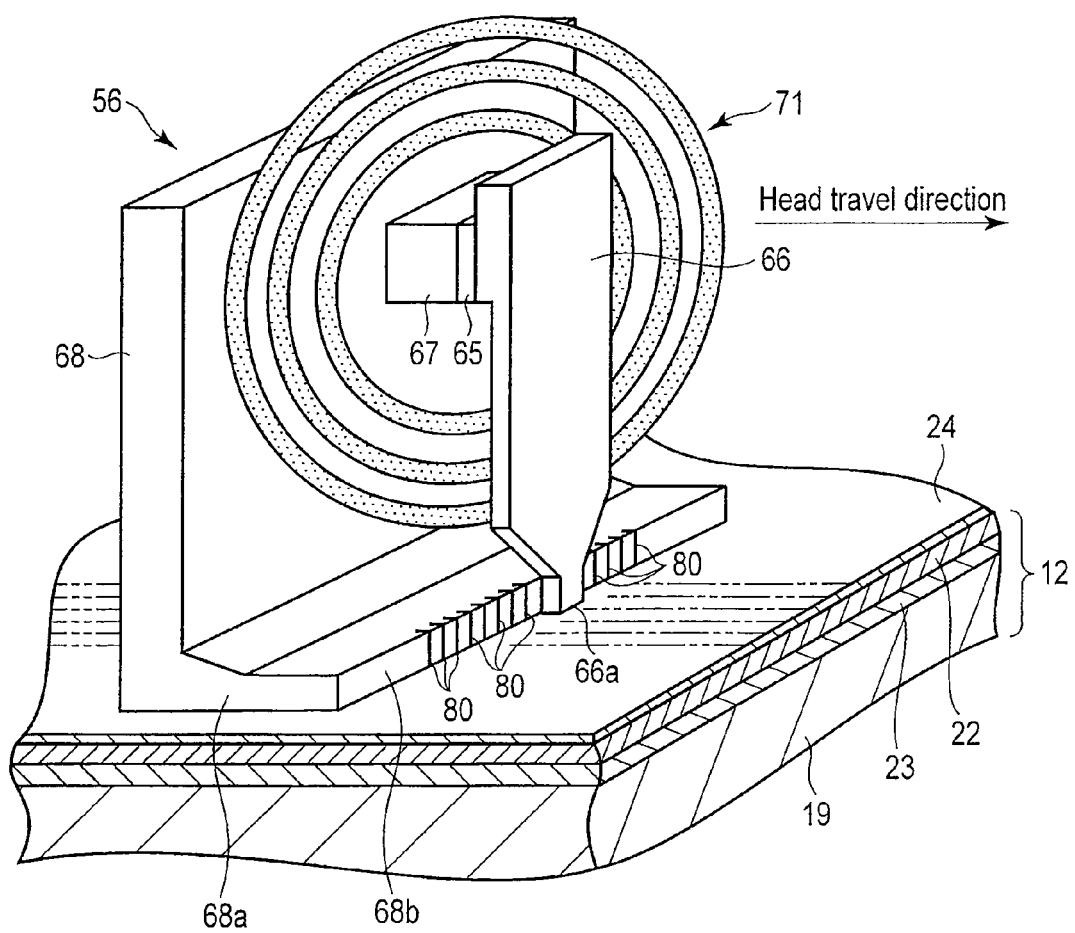
FIG. 9 is an exemplary perspective view schematically showing a recording head of a magnetic head of an HDD according to a second embodiment.
Figure 10:
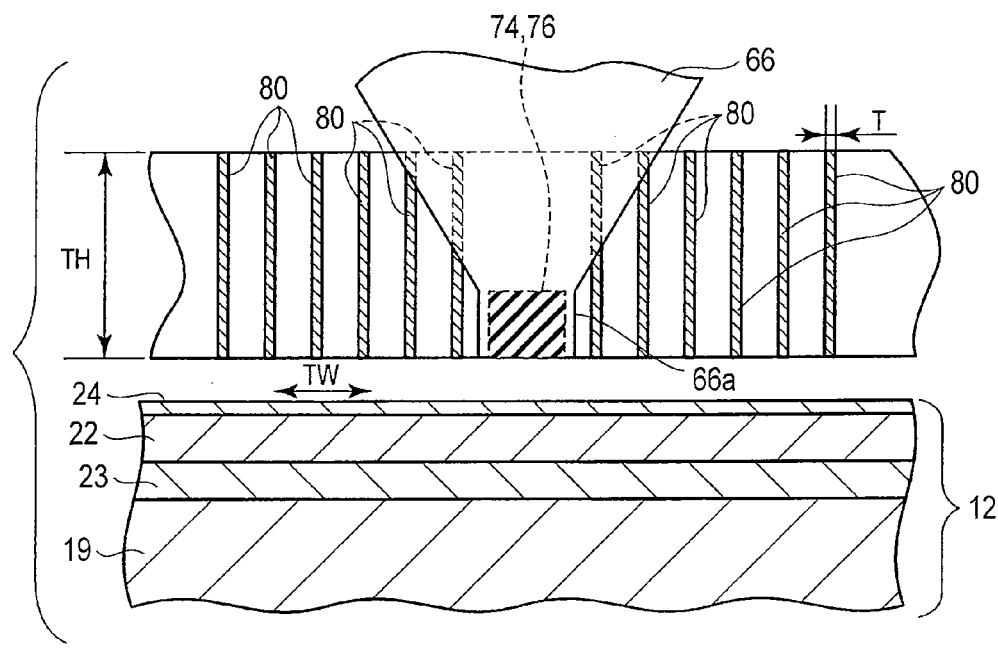
FIG. 10 is an exemplary enlarged front view showing a disk-side portion of the recording head according to the second embodiment.
Figure 11:
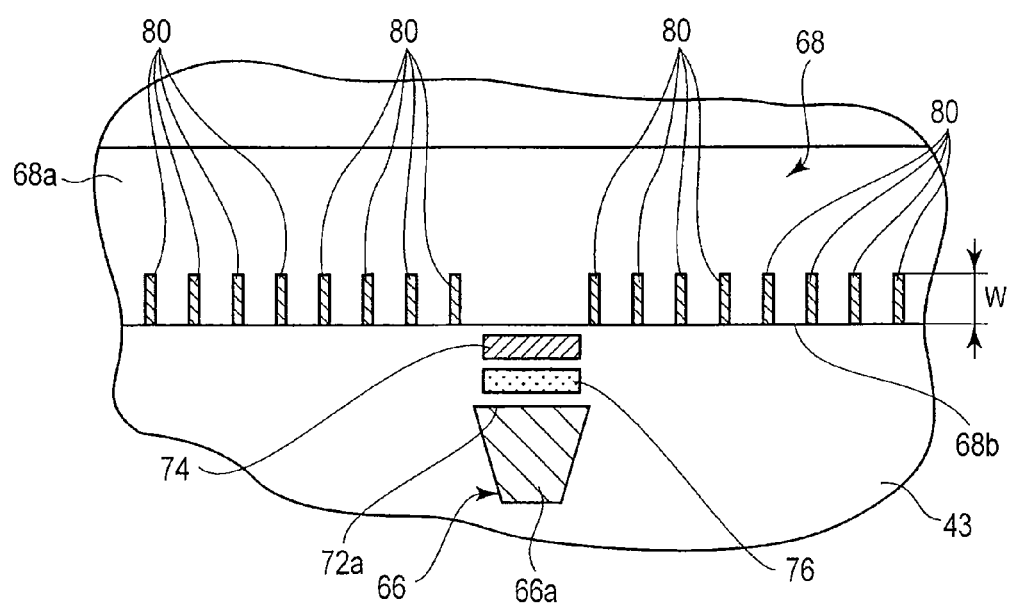
FIG. 11 is an exemplary plan view of the recording head taken from the ABS side.

FIG. 9 is a perspective view schematically showing a recording head of a magnetic head of an HDD according to a second embodiment, FIG. 10 is a front view of a lower end portion of the recording head taken from the main-pole side, and FIG. 11 is a plan view of the recording head taken from the ABS side of a slider.

According to the second embodiment, as shown in FIGS. 9 to 11, a recording head 56 of a magnetic head for perpendicular magnetic recording comprises a spin-torque oscillator 74 and spin injection layer 76, which are interposed between a leading end surface 68b of a return pole 68 and a trailing end surface 72a of a tapered distal end portion 66a of a main pole 66.

A pair of or more nonmagnetic layers 80 are arranged on the leading end surface 68b of the return pole 68 that faces the spin-torque oscillator 74. Alumina ($Al_2O_3$), ruthenium, or copper may be used for the nonmagnetic layers 80. Preferably, the nonmagnetic layers 80 should be located outside the trailing end positions of the main pole 66. Spin waves transmitted by a magnetic field, compared with those transmitted by ferromagnetic coupling of atoms, excite magnetization rotation in the range of 10-nm order. Therefore, the two or more nonmagnetic layers 80 are arranged at intervals of about 10 nm in the direction of the track width TW.

Preferably, two of the nonmagnetic layers 80 that are located closest to the spin-torque oscillator 74 should be located outside the end positions of the trailing end surface of the main pole 66 along the track width. Further, the distance between these two nonmagnetic layers 80 along the track width is slightly greater than the width of the oscillator 74 along the track width. Thus, the nonmagnetic layers 80 are located outside the end positions of the oscillator 74 along the track width. The other nonmagnetic layers 80 are successively arranged outside the foregoing two adjacent nonmagnetic layers 80.

The thickness T of each nonmagnetic layer 80 in the direction of the track width TW is set to be about 1 nm. The lattice constant of typical FeNi (permalloy) used for the return pole 68 is 3.55 Å. Therefore, propagation of spin waves transmitted from the spin-torque oscillator 74 to the return pole 68 by ferromagnetic coupling of atoms can be fully suppressed with a thickness of 1 nm.

The width W of each nonmagnetic layer 80 along the depth, that is, perpendicular to the leading end surface 68b, is set to be 5 nm or more. The propagation of spin waves perpendicular to the trailing end surface of the return pole 68, compared with those propagated along the film surface of the return pole 68, is prevented by the flow of magnetic flux in the magnetic path including the main and return poles 66 and 68. Therefore, a propagation suppression effect can be obtained if each nonmagnetic layer 80 has a width W of 5 to 10 nm.

Since spin waves propagate to the entire film surface of the return pole 68, the height of each nonmagnetic layer 80 above the ABS 43 should preferably be made equal to the length TH of the return pole 68 above the ABS 43.

Other configurations of the HDD and magnetic head are the same as those of the first embodiment. According to the recording head 56 of the magnetic head of the second embodiment constructed in this manner, the two or more nonmagnetic layers 80 can suppress the spin waves transmitted by ferromagnetic coupling of atoms that propagate to the film surface of the return pole 68 and those transmitted by a magnetic field. Thus, the spin-torque oscillator 74 can be effectively caused to oscillate, so that the bit error rate can be considerably improved. Since the degree of improvement of the bit error rate along the track width is substantially equal to that for the spin-torque oscillator 74, the track density can be maintained or improved depending on the width of the spin-torque oscillator.

Third Embodiment

Figure 13:
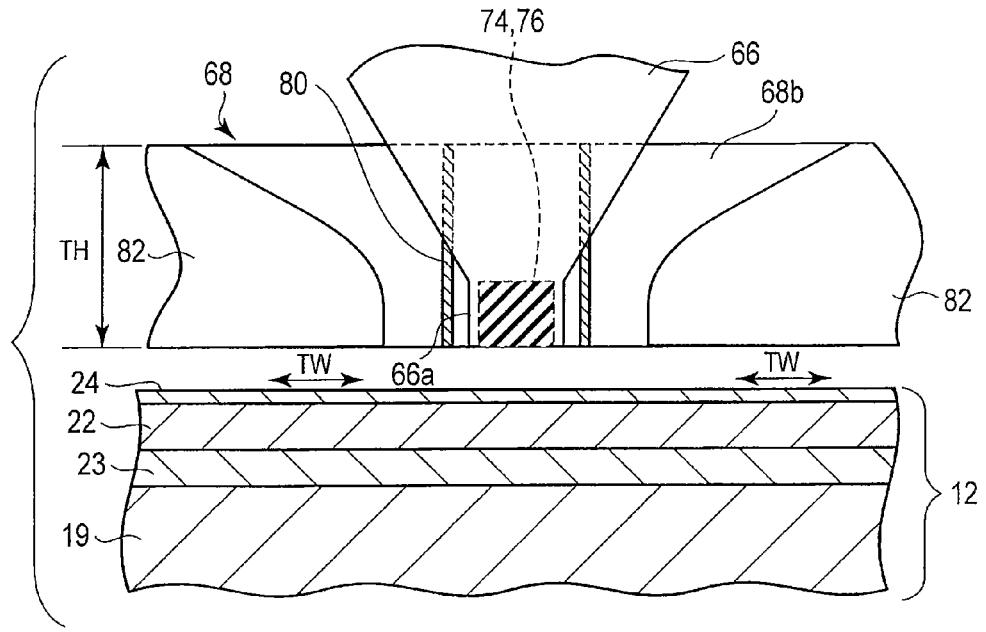
FIG. 13 is an exemplary enlarged front view showing a disk-side portion of the recording head according to the third embodiment.
Figure 14:
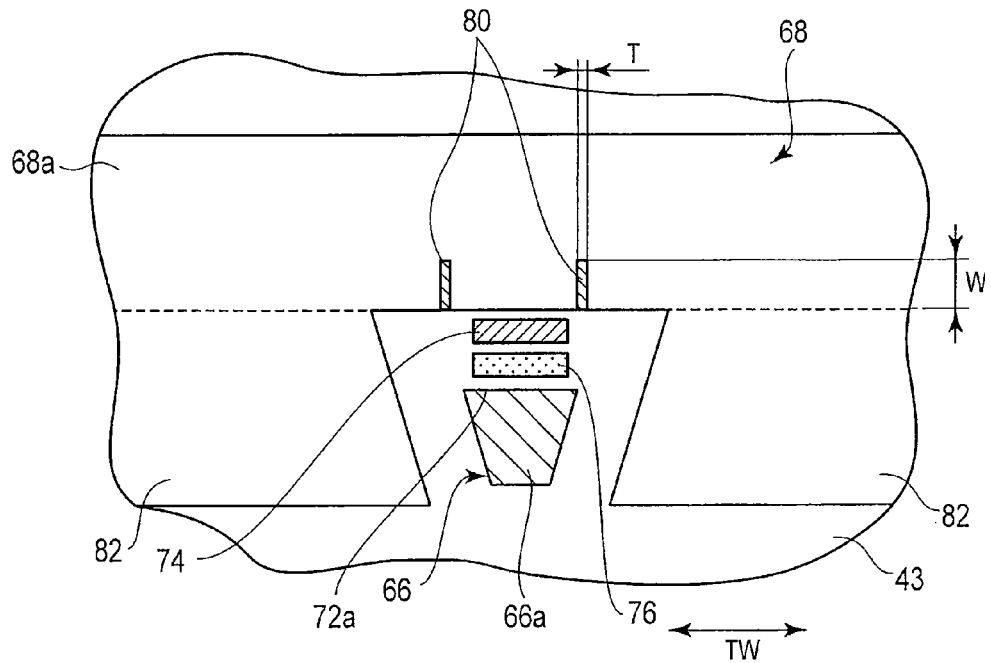
FIG. 14 is an exemplary plan view of the recording head taken from the ABS side.

FIG. 12 is a perspective view schematically showing a recording head of a magnetic head of an HDD according to a third embodiment, FIG. 13 is a front view of a lower end portion of the recording head taken from the main-pole side, and FIG. 14 is a plan view of the recording head taken from the ABS side of a slider.

According to the third embodiment, as shown in FIGS. 12 to 14, a recording head 56 of a magnetic head for perpendicular magnetic recording comprises a pair of side shields 82, as well as main pole 66 and return pole 68. Further, the recording head 56 comprises a spin-torque oscillator 74 and spin injection layer 76, which are interposed between a leading end surface 68b of the return pole 68 and a trailing end surface 72a of a tapered distal end portion 66a of the main pole 66.

The side shields 82 are arranged individually on the opposite sides of the main pole 66 along the track width so as to be connected to the return pole 68 and magnetically separated from the main pole 66 on the ABS 43. In the present embodiment, the side shields 82 are formed integrally with a distal end portion 68a of the return pole 68 from a high-permeability material, and protrude from the leading end surface 68b of the distal end portion 68a toward the leading end of a slider 42. At least a part of each side shield 82 is opposed to the vicinity of the distal end portion 66a of the main pole 66 across a gap narrower than a write gap.

A pair of nonmagnetic layers 80 are arranged on the leading end surface 68b of the return pole 68 that faces the spin-torque oscillator 74. Alumina ($Al_2O_3$), ruthenium, or copper may be used for the nonmagnetic layers 80. The nonmagnetic layers 80 are disposed in the return pole 68 so as to extend from its leading end surface 68b and separate from the oscillator 74. In other words, the nonmagnetic layers 80 extend at an angle from the leading end surface 68b into the return pole 68. In the present embodiment, each nonmagnetic layer 80 extends at right angles to the leading end surface 68b into the return pole. Further, each nonmagnetic layer 80 extends upward from the lower end surface of the return pole 68, that is, the ABS 43, to the upper surface of the distal end portion of the return pole.

Preferably, the pair of nonmagnetic layers 80 should be located outside the end positions of the trailing end surface of the main pole 66 along the track width. Further, the distance between the nonmagnetic layers 80 along the track width is slightly greater than the width of the spin-torque oscillator 74 along the track width. Thus, the nonmagnetic layers 80 are located outside the end positions of the oscillator 74 along the track width.

The thickness T of each nonmagnetic layer 80 in the direction of the track width TW is set to be about 1 nm. The lattice constant of typical FeNi (permalloy) used for the return pole 68 is 3.55 Å. Therefore, propagation of spin waves transmitted from the spin-torque oscillator 74 to the return pole 68 by ferromagnetic coupling of atoms can be fully suppressed with a thickness of 1 nm.

The width W of each nonmagnetic layer 80 along the depth, that is, perpendicular to the leading end surface 68b, is set to be 5 nm or more. The propagation of spin waves perpendicular to the trailing end surface of the return pole 68, compared with those propagated along the film surface of the return pole 68, is prevented by the flow of magnetic flux in the magnetic path including the main and return poles 66 and 68. Therefore, a propagation suppression effect can be obtained if each nonmagnetic layer 80 has a width W of 5 to 10 nm.

Since spin waves propagate to the entire film surface of the return pole 68, the height of each nonmagnetic layer 80 above the ABS 43 should preferably be made equal to the length TH of the return pole 68 above the ABS 43.

Other configurations of the HDD and magnetic head of the third embodiment are the same as those of the first embodiment. According to the recording head 56 of the magnetic head of the third embodiment constructed in the manner described above, the nonmagnetic layers 80 can suppress the spin waves transmitted by ferromagnetic coupling of atoms that propagate to the film surface of the return pole 68 and those transmitted by a magnetic field. Thus, the spin-torque oscillator 74 can be effectively caused to oscillate, so that the bit error rate can be considerably improved. Since the degree of improvement of the bit error rate along the track width is substantially equal to that for the spin-torque oscillator 74, the track density can be maintained or improved depending on the width of the spin-torque oscillator.

Further, the side shields 82 can suppress leakage of magnetic flux that flows directly from the tapered portion of the main pole 66 into a recording layer 22 of a medium. Thus, extended recording of signals along the track width can be suppressed, so that the track density can be improved. Since magnetization at acute-angle corners or junctions between the write/shield pole 68 and side shields 82 is not uniform, moreover, magnetization rotation can be suppressed by flux pinning, and propagation of spin waves can be suppressed.

Fourth Embodiment

Figure 15:
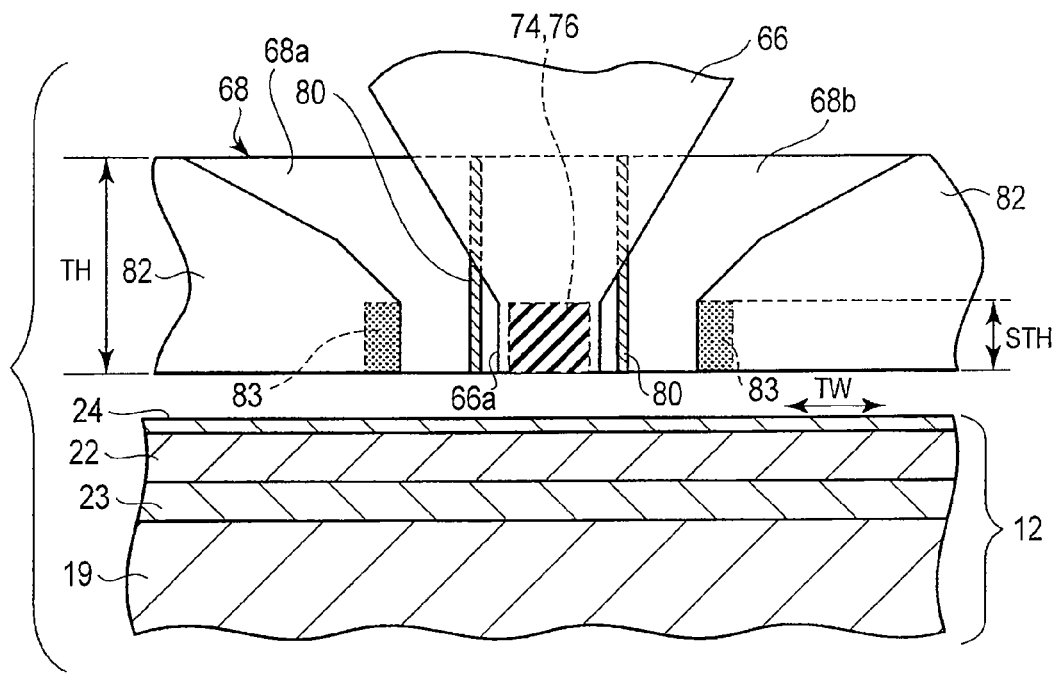
FIG. 15 is an exemplary enlarged front view showing a disk-side portion of a recording head of an HDD according to a fourth embodiment.
Figure 16:
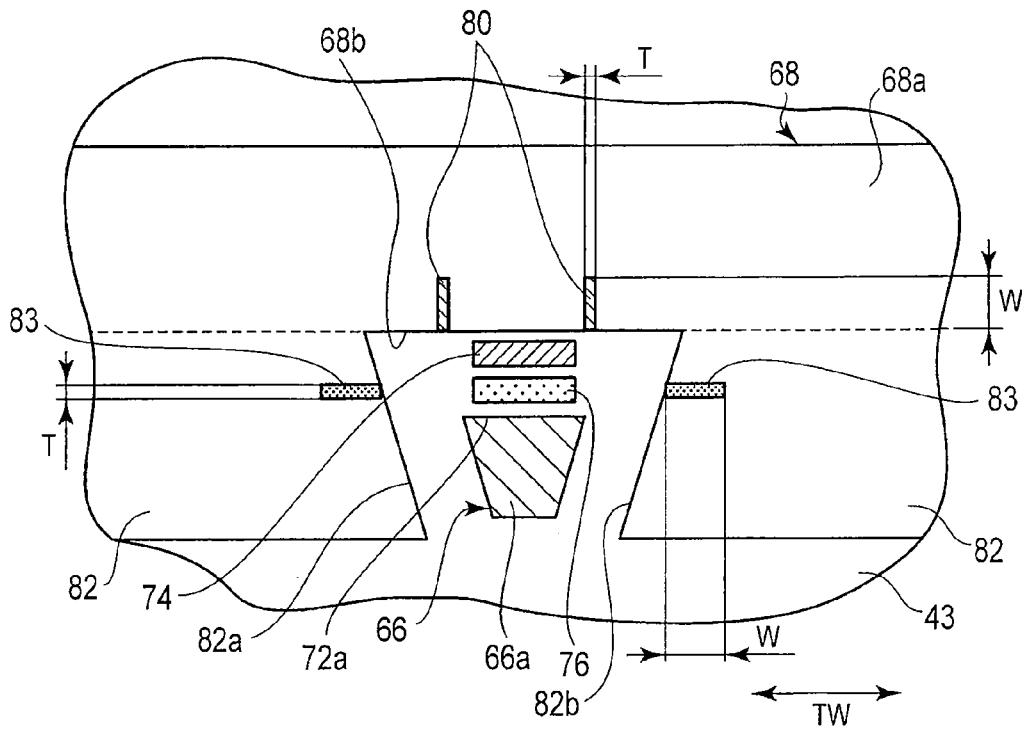
FIG. 16 is an exemplary plan view of the recording head taken from the ABS side.

FIG. 15 is a front view of a lower end portion of a recording head of a magnetic head of an HDD according to a fourth embodiment taken from the main-pole side, and FIG. 16 is a plan view of the recording head taken from the ABS side of a slider.

According to the fourth embodiment, as shown in FIGS. 15 and 16, a recording head 56 of a magnetic head for perpendicular magnetic recording comprises a main pole 66, return pole 68, a pair of side shields 82, spin-torque oscillator 74, spin injection layer 76, and a pair of nonmagnetic layers 80, and is constructed in the same manner as that of the third embodiment. The oscillator 74 and spin injection layer 76 are interposed between a leading end surface 68b of the return pole 68 and a trailing end surface 72a of a tapered distal end portion 66a of the main pole 66. The nonmagnetic layers 80 are arranged on the leading end surface 68b of the return pole 68 that faces the oscillator 74.

In the present embodiment, the recording head 56 further comprises a pair of nonmagnetic layers 83 for use as nonmagnetic portions attached to the side shields 82. Alumina ($Al_2O_3$), ruthenium, or copper may be used for the nonmagnetic layers 83. Each nonmagnetic layer 83 is disposed in its corresponding side shield 82 so as to extend from a main-pole-side end surface 82a of the side shield 82, which faces the main pole 66, and separate from the spin-torque oscillator 74. In other words, each nonmagnetic layer 83 extends at an angle from the main-pole-side end surface 82a into the return pole. In the present embodiment, each nonmagnetic layer 83 extends at right angles to the main-pole-side end surface 82a in the direction of the track width TW. Further, each nonmagnetic layer 83 extends from the lower end surface of the side shield 82, that is, an ABS 43, into the side shield 82. The nonmagnetic layers 83 are arranged so as to face a position between the spin-torque oscillator 74 and the trailing end surface 72a of the main pole 66.

Since spin waves propagate to the film surface of each side shield 82, the thickness T of each nonmagnetic layer 83 and the width W along the direction of the track width TW are set to be about 1 nm and 5 nm or more, respectively, for the same reason as in the case of the return pole 68. The spin waves that propagate from the film surface of the return pole 68 to the side shields 82 propagate to the entire side shield film surface. Preferably, therefore, the height of each nonmagnetic layer 83 above the ABS 43 should be made equal to the length STH of each side shield 82 above the ABS 43.

Other configurations of the HDD and magnetic head of the fourth embodiment are the same as those of the third embodiment. According to the recording head 56 of the magnetic head of the fourth embodiment constructed in the manner described above, the nonmagnetic layers 80 can suppress the spin waves transmitted by ferromagnetic coupling of atoms that propagate to the film surface of the return pole 68 and those transmitted by a magnetic field. Thus, the spin-torque oscillator 74 can be effectively caused to oscillate, so that the bit error rate can be considerably improved. Since the degree of improvement of the bit error rate along the track width is substantially equal to that for the spin-torque oscillator 74, the track density can be maintained or improved depending on the width of the spin-torque oscillator.

Further, the side shields 82 can suppress leakage of magnetic flux that flows directly from the tapered portion of the main pole 66 into a recording layer 22 of a medium. Thus, extended recording of signals along the track width can be suppressed, so that the track density can be improved. Since magnetization at acute-angle corners or junctions between the write/shield pole 68 and side shields 82 is not uniform, moreover, magnetization rotation can be suppressed by flux pinning, and propagation of spin waves that flow into the side shields 82 can be suppressed by means of the nonmagnetic layers 83.

Fifth Embodiment

FIG. 17 is a front view of a lower end portion of a recording head of a magnetic head of an HDD according to a fifth embodiment taken from the main-pole side, and FIG. 18 is a plan view of the recording head taken from the ABS side of a slider.

According to the fifth embodiment, as shown in FIGS. 17 and 18, a recording head 56 of a magnetic head for perpendicular magnetic recording comprises a main pole 66, return pole 68, spin-torque oscillator 74, and spin injection layer 76. The oscillator 74 and spin injection layer 76 are interposed between a leading end surface 68b of the return pole 68 and a trailing end surface 72a of a tapered distal end portion 66a of the main pole 66. The recording head 56 comprises one or more nonmagnetic layers 80. According to the present embodiment, the main pole 66, not the return pole 68, is provided with the nonmagnetic layers 80.

In this case, one or more, e.g., a pair of, nonmagnetic layers 80 are arranged on the trailing end surface 72a of the distal end portion 66a that faces the spin-torque oscillator 74. Alumina ($Al_2O_3$), ruthenium, or copper may be used for the nonmagnetic layers 80. The distance between the nonmagnetic layers 80 along the track width is slightly greater than the width of the spin-torque oscillator 74 along the track width. Thus, the nonmagnetic layers 80 are located outside the end positions of the oscillator 74 along the track width. Spin waves transmitted by a magnetic field, compared with those transmitted by ferromagnetic coupling of atoms, excite magnetization rotation in the range of 10-nm order. Therefore, the nonmagnetic layers 80 are arranged at intervals of about 10 nm in the direction of the track width TW.

The nonmagnetic layers 80 are disposed in the main pole 66 so as to extend from its trailing end surface 72a and separate from the spin-torque oscillator 74. In other words, the nonmagnetic layers 80 extend at an angle from the trailing end surface 72a into the main pole 66. In the present embodiment, each nonmagnetic layer 80 extends at right angles to the trailing end surface 72a into the main pole. Further, each nonmagnetic layer 80 extends substantially vertically upward from the lower end surface of the main pole 66, that is, an ABS 43, toward an upper part of the main pole.

The thickness T of each nonmagnetic layer 80 in the direction of the track width TW is set to be about 1 nm. The lattice constant of typical FeNi (permalloy) used for the return pole 68 is 3.55 Å. Therefore, propagation of spin waves transmitted from the spin-torque oscillator 74 to the return pole 68 by ferromagnetic coupling of atoms can be fully suppressed with a thickness of 1 nm.

The width W of each nonmagnetic layer 80 along the depth, that is, perpendicular to the trailing end surface 72a, is set to be 5 nm or more. The propagation of spin waves perpendicular to the trailing end surface 72a of the main pole 66, compared with those propagated along the film surface of the main pole 66, is prevented by the flow of magnetic flux in the magnetic path including the main and return poles 66 and 68. Therefore, a propagation suppression effect can be obtained if each nonmagnetic layer 80 has a width W of 5 to 10 nm.

Spin waves propagate to the entire film surface of the main pole 66, and a magnetic circuit interposed between the return pole 68 and the tapered distal end portion of the main pole 66 forms a gap magnetic field. Preferably, therefore, the height of each nonmagnetic layer 80 above the ABS 43 should be made at least greater than the length TH of the return pole 68 above the ABS 43.

Other configurations of the HDD and magnetic head of the fifth embodiment are the same as those of the first embodiment. According to the recording head 56 of the magnetic head of the fifth embodiment constructed in the manner described above, the nonmagnetic layers 80 in the main pole 66 can suppress the spin waves transmitted by ferromagnetic coupling of atoms that propagate to the film surface of the main pole 66 and those transmitted by a magnetic field. Thus, the spin-torque oscillator 74 can be effectively caused to oscillate, so that the bit error rate can be considerably improved. Since the degree of improvement of the bit error rate along the track width is substantially equal to that for the spin-torque oscillator 74, the track density can be maintained or improved depending on the width of the spin-torque oscillator.

Figure 19:
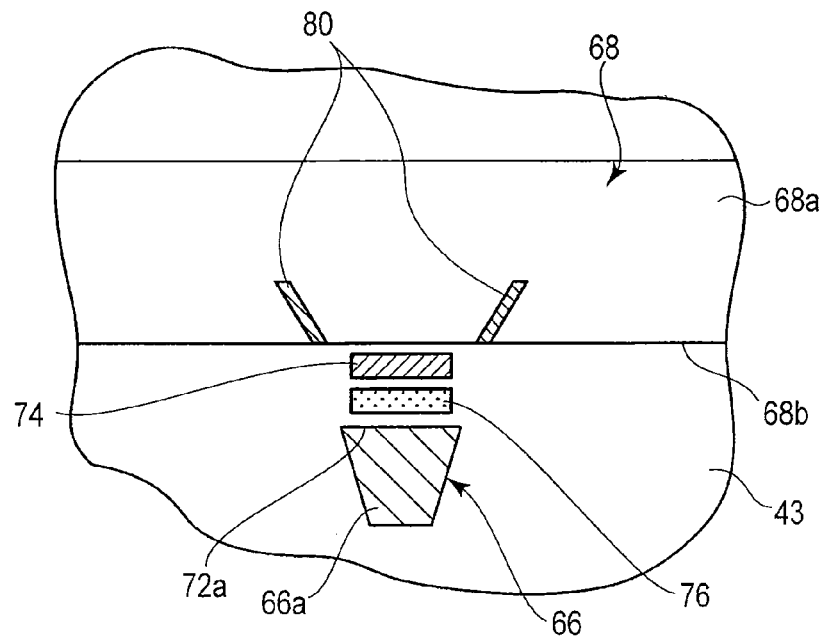
FIG. 19 is an exemplary plan view of a recording head according to a modification taken from the ABS side.
Figure 20:
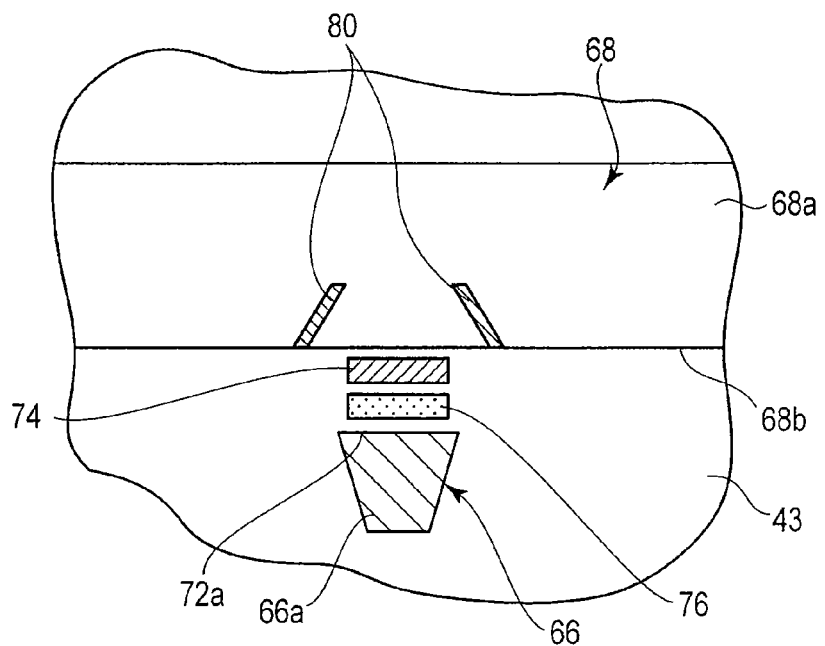
FIG. 20 is an exemplary plan view of a recording head according to another modification.

Although each nonmagnetic layer 80 is configured to extend at right angles to the trailing end surface of the return pole or the leading end surface of the main pole in the embodiment described above, it only needs to extend at an angle to the pole end surfaces. For example, each nonmagnetic layer 80 may be configured to extend at an outward or inward angle to the leading end surface 68b of the return pole 68, as shown in FIG. 19 or 20.

According to the first to fifth embodiments described herein, there may be provided a magnetic head configured for improved recorded signal quality and recording density and a disk drive provided with the same.

For example, the nonmagnetic layers of the recording head may be provided in either of the main and return poles instead of being provided in only one of the poles. The number of nonmagnetic layers is not limited to two and may be increased as required. If necessary, moreover, the materials, shapes, sizes, etc., of the constituent elements of each nonmagnetic layer may be changed without being limited to the embodiments described herein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head for perpendicular magnetic recording, comprising:
    a main pole configured to apply a recording magnetic field perpendicular to a recording layer of a recording medium;
    a return pole opposed to a trailing side of the main pole across a write gap and configured to return magnetic flux from the main pole to form a magnetic circuit in conjunction with the main pole;
    a coil configured to excite magnetic flux in the magnetic circuit;
    a spin-torque oscillator located between respective facing surfaces of the return pole and an end portion of the main pole on the recording-medium side and configured to produce a high-frequency magnetic field;
    a current source configured to apply current to the spin-torque oscillator through the return and main poles; and
    a nonmagnetic layer provided in at least one of the poles and extending from a facing surface of the at least one of the poles, which faces the spin-torque oscillator, into the at least one of the poles.

2. The magnetic head of claim 1, comprising a pair of nonmagnetic layers provided in the return pole in the vicinity of the spin-torque oscillator, wherein the nonmagnetic layers individually extend from and across an end surface of the return pole which faces the spin-torque oscillator and are located outside a width of the oscillator along a width of a track.

3. The magnetic head of claim 2, wherein the return pole comprises a plurality of other nonmagnetic layers arranged outside the pair of nonmagnetic layers with respect to the spin-torque oscillator and at intervals along the track width, the other nonmagnetic layers individually extending from and across the end surface.

4. The magnetic head of claim 1, comprising a pair of nonmagnetic layers provided in the main pole in the vicinity of the spin-torque oscillator, wherein the nonmagnetic layers individually extend from and across an end surface of the main pole which faces the spin-torque oscillator and are located outside a width of the oscillator along a width of a track.

5. The magnetic head of claim 1, comprising side shields arranged individually on opposite sides of the main pole along a width of a track and spaced apart from the main pole.

6. The magnetic head of claim 5, wherein the side shields individually comprise end surfaces opposed to the main pole, and which further comprises nonmagnetic layers provided individually in the side shields and extending from and across the end surface.

7. The magnetic head of claim 1, wherein the non-magnetic layer extends into the at least one of the poles in a direction that is perpendicular to the facing surface and the direction forms a non-zero angle with respect to a recording layer of a recording medium.

8. A disk drive comprising:
    a disk shaped recording medium comprising a recording layer having a magnetic anisotropy perpendicular to a surface of a recording medium;
    a drive section configured to support and rotate the recording medium; and
    the magnetic head of claim 1 configured to perform data processing on the recording medium.

9. The disk drive of claim 8, wherein the magnetic head comprises a pair of nonmagnetic layers provided in the return pole in the vicinity of the spin-torque oscillator, wherein the nonmagnetic layers individually extend from and across an end surface of the return pole which faces the spin-torque oscillator and are located outside a width of the oscillator along a width of a track.

10. The disk drive of claim 9, wherein the return pole comprises a plurality of other nonmagnetic layers arranged outside the pair of nonmagnetic layers with respect to the spin-torque oscillator and at intervals along the track width, the other nonmagnetic layers individually extending from and across the end surface.

11. The disk drive of claim 8, wherein the magnetic head comprises a pair of nonmagnetic layers provided in the main pole in the vicinity of the spin-torque oscillator, wherein the nonmagnetic layers individually extend from and across an end surface of the main pole which faces the spin-torque oscillator and are located outside a width of the oscillator along a width of a track.

12. The disk drive of claim 8, wherein the magnetic head comprises side shields arranged individually on opposite sides of the main pole along a width of a track and spaced apart from the main pole.

13. The disk drive of claim 12, wherein the side shields individually comprise end surfaces opposed to the main pole, and which further comprises nonmagnetic layers provided individually in the side shields and extending from and across the end surface.

14. The disk drive of claim 8, wherein the non-magnetic layer extends into the at least one of the poles in a direction that is perpendicular to the facing surface and the direction forms a non-zero angle with respect to a recording layer of a recording medium.

* * * * *